United States Patent Office 3,063,901
Patented Nov. 13, 1962

3,063,901
COMPOSITION AND METHOD FOR TREATING ANTICHOLINESTERASE POISONING
John F. O'Leary, Bel Air, Anne M. Kunkel, Baltimore, and Aili H. Jones, North East, Md., assignors to the United States of America as represented by the Secretary of the Army
No Drawing. Filed Oct. 3, 1960, Ser. No. 60,230
4 Claims. (Cl. 167—65)
(Granted under Title 35, U.S. Code (1952), sec. 266)

The invention described herein may be manufactured and used by or for the Government of the United States of America for governmental purposes without the payment to us of any royalty thereon.

This invention relates to a therapeutic mixture of a monoquaternary oxime with a bis-quarternary dioxime and atropine.

Oximes such as pyruvaldehyde aldoxime (isonitrosoacetone, MINA), 2,3-butanedione-2-oxime (DAM), 2-formyl-1-methylpyridinium chloride (or iodide) oxime (2-PAM-Cl), 1,1'-trimethylene bis(4-formylpyridinium bromide) dioxime (TMB-4), and 2-formyl 1-methylpyridinium lactate oxime (2-PAML), tartrate oxime (2-PAMT), fumarate oxime (2-PAMF), nitrate oxime (2-PAMN), hydrogen sulfate oxime (2-PAMHS) have been reported to be effective, when given with atropine, in preventing and overcoming the toxic effects occurring in animals poisoned with inhibitors of the enzyme chlorinesterase such as: isopropyl methylphosphonofluoridate (sarin or GB), diisopropyl phosphonofluoridate (DFP), diethyl-p-nitrophenyl phosphate (paraoxon), ethyl phosphorodimethylamidocyanidate (tabun or GA), and tetraethyl pyrophosphate (TEPP). It has also been reported that atropine, when administered with one of the above oximes, produces a more effective result than when either one of the drugs is given alone.

We have found that atropine admixed with monoquaternary oxime and a bis-quarternary oxime increased the $LD_{50}$ value of GB several hundred times when given intravenously 30 seconds after the GB has been administered. Such astounding results were quite unexpected.

The following tables show some of the results of our tests:

TABLE I

*The Intravenous $LD_{50}$ of GB in Rabbits as Modified by Intravenous Treatment With Oximes and Atropine [1] 30 Seconds After the GB*

| Treatment [2] | $LD_{50}\pm SE$, μg./kg. | Multiples of Untreated GB $LD_{50}$ | Maximum "No Death" Dose of GB, 6 animals μg./kg. |
|---|---|---|---|
| None | 13.2±2.3 | 1.0 | 7.5 |
| Atropine (At) | 40.0±3.9 | 3.0 | 24.0 |
| At+DAM | 52.0±7.2 | 3.9 | 36.0 |
| At+2-PAM | 365±28.0 | 28 | 36.0 |
| At+2-PAML | 410±74.9 | 31 | 122.0 |
| At+TMB-4 | 790±192 | 59 | 183.0 |
| At+2-PAM+DAM | 205±19.2 | 16 | 122.0 |
| At+2-PAM+MINA | 370±50.1 | 28 | 122.0 |
| At+TMB-4+DAM | 440±40.4 | 33 | 183.0 |
| At+2-PAM+TMB-4 | 1,560±236.5 | 118 | 412.0 |
| At+2-PAML+TMB-4 | 3,950±927.0 | 299 | 1,390.0 |
| At+2-PAMCl+TMB-4Cl$_2$ | 2,270±395.0 | 172 | 927.0 |

[1] Atropine dose, 2 mg./kg. in all cases where indicated.
[2] Doses of 2-PAM, TMB-4, and 2-PAML: 5 mg./kg. Dose of DAM: 40 mg./kg. Dose of MINA: 35 mg./kg. Each given in same solution with atropine.

Table I shows the different treatments which were employed on the rabbit subjects. The $LD_{50}$ is the amount of GB in micrograms per kilogram of subject weight which was injected into the rabbits and which killed 50% of them. The column "Multiples of Untreated GB $LD_{50}$" shows the improvement over the untreated $LD_{50}$; for example, the At+2 PAML+TMB-4 mixture gas a result 241 times better than the untreated $LD_{50}$ result. The last column discloses the largest dose of GB which could be administered without killing any of the rabbits used. In these tests, each of the doses of 2-PAM, TMB-4 and 2-PAML was 5 mg./kg. so that the oxime mixture amounted to a total of 10 mg./kg., whereas only 5 mg./kg. was employed when only one oxime was used. In order to be sure that the additional amount of oxime was not responsible for the improved results, tests were made using 10 mg./kg. of only one oxime with the atropine. Results showed that a 10 mg./kg. dose of a single oxime gave better therapy than a 5 mg./kg. dose of the same oxime but did not approach the high order of efficacy of the mixture of the two oximes. Therefore, the improved therapy by the mixed oximes was not due to the amount of total oxime used but to some mechanism of action which follows the administration of the combination of the 2-PAM type oxime and the TMB-4 type oxime. It should be noted that the non-quaternary oximes DAM or MINA when mixed with 2-PAM did not increase the $LD_{50}$. In fact, DAM lowered the number of $LD_{50}$'s from 25 to 14. This shows that not all types of oximes can be added together to get superior results.

TABLE II

*Mortality Response to Subcutaneous GB in Rabbits as Influenced by Prophylactic (30 Min.) Oximes [1] and Atropine [2] Given Intramuscularly*

| GB Dose Levels, μg./kg. | Survival | | | | |
|---|---|---|---|---|---|
| | No Treatment | Atropine Alone | Atropine+ 2-PAML | Atropine+ 2-PAML +TMB-4 | Atropine+ TMB-4 |
| 24 | 5/6 | 6/6 | | | |
| 36 | 1/6 | 4/6 | 6/6 | 6/6 | 6/6 |
| 54 | 0/6 | 4/6 | 3/6 | 5/6 | 3/6 |
| 81 | | 3/6 | 3/6 | 4/6 | 3/6 |
| 122 | | 0/6 | 2/6 | 5/6 | 3/6 |
| 183 | | | 2/6 | 4/12 | 2/6 |
| 275 | | | 0/6 | 5/6 | 3/6 |
| 412 | | | | 5/6 | 2/6 |
| 618 | | | | 2/6 | 0/6 |
| 927 | | | | 3/6 | |
| 1,390 | | | | 1/6 | |
| 2,058 | | | | 1/6 | |
| 3,127 | | | | 0/6 | |

[1] Oxime dose, each 5 mg./kg.
[2] Atropine dose, 2 mg./kg., given with the oxime(s).

Table II presents data that also prove the superiority of the oxime mixture. In this instance the GB was administered subcutaneously and treatment was by the intramuscular route. Treatment was given prophylactically, i.e., 30 minutes prior to poisoning with GB. The numerators stand for rabbit survivors, the denominators for total rabbits treated. The data are self-evident.

It should be noted that the specific dosage of atropine may be varied from one situation to another; for example, the dosage for a dog may be different than that for a cat in a given situation. Since atropine has been used for many years, those skilled in the art would know the correct dosage in any given situation. Furthermore, the atropine need not be administered with the oxime mixture, nor is it required to use the same route of administration.

TABLE III

*Antagonism of Neuromuscular Block Due to Intravenous GB, 220 µg./kg.,[1] in Anesthetized Cats*

| Oxime, 5 to 8 min. after initial GB dose | Number of Cats [2] | Time after oximes for 85% recovery of Twitch Response, Min., Avg. |
|---|---|---|
| None | 3 | 22.3 |
| 2-PAML, 10 mg./kg | 2 | 15.5 |
| TMB4, 5 mg./kg | 3 | 13.5 |
| 2-PAMCl+TMB4Cl[2], each 5 mg./kg | 3 | 7.7 |

[1] Ten times the estimated $LD_{50}$ in unanesthetized cats.
[2] Each received atropine sulfate 0.5 mg./kg. intravenously 0.5 hour before GB.

Table III presents data which shows the effectiveness of the oxime mixture when administered 35 to 38 minutes after atropine sulfate and 5 to 8 minutes after the initial GB dose.

TABLE IV

*Efficacy of Prophylactic Oxime Mixture Against the Lethality of Subcutaneous GB in Rabbits*

| Prophylaxis (30 min.) | | | GB | |
|---|---|---|---|---|
| Atropine Sulfate, mg./kg., i.m. | 2-PAML mg./kg. | TMB4 mg./kg. | $LD_{50}$[1]±S.E. µg./kg. | Multiples of $LD_{50}$ |
| 0 | 0 | 0 | 30.0±4 | 1.0 |
| 2 | 0 | 0 | 38.0±10.2 | 1.3 |
| [2]2 | 5 p.o. | 5 p.o. | 81.0±5.2 | 2.7 |
| 2 | 5 i.m. | 5 i.m. | 275.0±140 | 9.2 |

[1] Estimated by the method of Miller and Tainter (1944).
[2] Atropine given by another route than oxime.
P.o.—by mouth.
I.m.—intramuscularly.

Table IV presents data which discloses that the oxime mixture when administered by mouth increased the $LD_{50}$ two fold over the atropine treatment. However, the intramuscular administration by far produces the superior results.

In dogs, atropine 1 mg./kg. and oxime(s) were administered intravenously, 30 seconds after intravenous GA. results show that the mixed oximes (2-PAMCl+TMB-4Cl₂, 1:1)

are highly protective against GA at the 70 $LD_{50}$ level. Data on GA are presented in Table V.

TABLE V

*Efficacy of Various Oximes Intravenously as Atropine Adjuncts Given in Dogs 30 Seconds After the Intravenous Administration of 70 Times the $LD_{50}$ of GA*

| Treatment [1] | | Survivors | | Nonsurvivors, Death Time, Range |
|---|---|---|---|---|
| Oxime | Dose, mg./kg. | Fraction | Stand-up time, Min., (Range) | |
| 2-PAMCl | 7.5 | 0/6 | never | 45 min. to 24 hrs. |
| 2-PAMCl | 15 | 1/6 | 11 min | 6 min. to 2 days. |
| 2-PAMCl+ TMB4Cl[2]. | 7.5+7.5 | 5/6 | 6 hrs. to 24 hrs. | 2 min. |

[1] Atropine sulfate 1 mg./kg. in each case.

We have discovered that a monoquaternary oxime-bisquaternary dioxime mixture together with atropine produces a much superior treatment for anticholinesterase poisoning than any other compound or mixtures that have been tested to date.

We claim:
1. A composition for treating anticholinesterase poisoning which consists of atropine plus an effective amount of an oxime mixture of from 30 to 70% by weight of monoquaternary oxime salt and 70 to 30% by weight of bis-quaternary dioxime salt.
2. A method of treating animals for anticholinesterase poisoning which comprises the internal administration to the antimal of a mixture of from 70 to 30% by weight of a monoquaternary oxime and a 30 to 70% by weight of a bis-quaternary oxime, in conjunction with the standard atropine treatment.
3. The method of claim 2 wherein the internal administration consists of oral administration.
4. The method of claim 2 wherein the internal administration consists of an intramuscular administration.

References Cited in the file of this patent

Hobbiger: Brit. J. Pharmacol., vol. 12, 1957, pages 438–446.
Poziomek: J. Org. Chem., vol. 23, pages 714–717, 1958.
Bay: Federation Proceedings, March 1959, No. 1, Part I, page 366, Abstract 1445.
Drug Trade News, 34:3, February 9, 1959, pages 41 and 71.
Willis: Pharm. of Anticholinesterases, C.W.L. 2–14, pages 16–20, September 11, 1959.